United States Patent [19]

Ito

[11] Patent Number: 5,402,036
[45] Date of Patent: Mar. 28, 1995

[54] LOW PRESSURE MERCURY VAPOR DISCHARGE LAMP HAVING DOUBLE LAYERS

[75] Inventor: Hidenori Ito, Kanagawa, Japan

[73] Assignee: Toshiba Lighting and Technology Corporation, Tokyo, Japan

[21] Appl. No.: 252,527

[22] Filed: Jun. 1, 1994

Related U.S. Application Data

[63] Continuation of Ser. No. 828,222, Jan. 30, 1992, abandoned.

[30] Foreign Application Priority Data

Jan. 30, 1991 [JP] Japan ............... 3-029430

[51] Int. Cl.$^6$ ................................. H01J 1/03
[52] U.S. Cl. .................... 313/487; 313/486; 313/489; 313/572; 313/635
[58] Field of Search ............. 313/487, 490, 565, 572, 313/642, 486, 489, 635; 252/301.4 P, 301.4 H

[56] References Cited

U.S. PATENT DOCUMENTS

| | | | |
|---|---|---|---|
| 3,707,642 | 12/1972 | Thornton, Jr. | 313/488 |
| 3,937,998 | 2/1976 | Verstegen et al. | 313/487 |
| 4,038,204 | 7/1977 | Wachtel | 252/301.4 P X |
| 4,088,923 | 5/1978 | Manders | 313/487 |
| 4,216,408 | 8/1980 | Verstegen et al. | 313/486 X |
| 4,335,330 | 6/1982 | Peters et al. | 313/486 |
| 4,423,349 | 12/1983 | Nakajima et al. | 313/486 |
| 4,431,941 | 2/1984 | Roy et al. | 313/487 |
| 4,447,756 | 5/1984 | Kohmoto et al. | 313/487 |
| 4,623,816 | 11/1986 | Hoffman et al. | 313/487 |
| 4,806,824 | 2/1989 | Paynter et al. | 313/486 |
| 4,879,492 | 11/1989 | Latassa et al. | 313/487 |
| 5,170,095 | 12/1992 | Bardos et al. | 313/487 X |

FOREIGN PATENT DOCUMENTS

| | | |
|---|---|---|
| 2509931 | 11/1979 | Germany . |
| 57-5785 | 1/1982 | Japan . |
| 60-9543 | 3/1985 | Japan . |
| 60-109164 | 6/1985 | Japan . |
| 1458700 | 10/1974 | United Kingdom . |
| 1480876 | 3/1975 | United Kingdom . |

OTHER PUBLICATIONS

Spring meeting of Electrochemical Soc., vol.: 82-1, Abstract 487, pp. 798-799 May 1982.

Primary Examiner—Donald J. Yusko
Assistant Examiner—Ashok Patel
Attorney, Agent, or Firm—Cushman, Darby & Cushman

[57] ABSTRACT

A low pressure mercury vapor discharge lamp is operated at a power more than 550 W/m$^2$. The lamp has a first layer comprising first grains coated on the inner surface of the tube thereof and a second layer comprising second grains coated on the first layer. The second grains are more positive in contact electrification than the first grains. The lamp reduces an early decrease in luminous flux.

14 Claims, 3 Drawing Sheets

LOW PRESSURE MERCURY VAPOR DISCHARGE LAMP HAVING DOUBLE LAYERS

This is a continuation of application Ser. No. 07/828,222, filed on Jan. 30, 1992, which was abandoned upon the filing hereof.

BACKGROUND OF THE INVENTION

1. Field of the invention

The present invention relates generally to a low pressure mercury vapor discharge lamp, and more particularly, to a low pressure mercury vapor discharge lamp having double layers on its inner surface.

2. Description of the Related Art

Low pressure mercury vapor discharge lamps are well-known, such as, for example, fluorescent lamps. In a typical fluorescent lamp, a fluorescent layer is coated on an inner surface of a glass tube defining a discharge space. The discharge space is filled with a rare gas, such as argon, along with mercury, as a discharge gas. A pair of electrodes are provided in the tube for generating a discharge in the tube.

When a voltage is applied between the electrodes, atoms of the mercury in the tube are excited and a discharge is generated in the tube between the electrodes. The excited mercury atoms emit ultraviolet rays which excite fluorescent materials of the fluorescent layer, thereby causing fluorescent materials emit a visible light.

Recently fluorescent lamps having high wall loads have been developed. Since these lamps have small diameter glass tubes, such as 10–15 mm in inner diameter, these lamps have high wall loads of more than 550 W/m$^2$. The fluorescent layers of lamps with high wall loads are generally likely to decrease in luminous efficiency or in luminous flux early in their lives. The reasons or mechanism of the early decrease have not yet been determined.

U.S. Pat. No. 4,335,330 teaches that fluorescent materials absorb excited mercury atoms and react with the excited mercury atoms and that, as a result, a darkening of the fluorescent layer occurs which considerably reduces the luminous flux of the lamp.

However, when lamps have double fluorescent layers, some still exhibit an early decrease in luminous flux, even if the fluorescent materials employed are among the materials taught as being good in U.S. Pat. No. 4,335,330.

SUMMARY OF THE INVENTION

It is an object of the present invention to reduce an early decrease in luminous flux in low pressure mercury vapor discharge lamps such as fluorescent lamps having double fluorescent layers.

To accomplish the objects described above, the present invention provides a low pressure mercury vapor discharge lamp having more than 550 W/m$^2$ in wall load. A glass tube having an inner surface and defining a discharge space is filled with an inert gas comprising mercury and a rare gas. A pair of electrodes are provided in the tube for generating a discharge in the discharge space. The inner surface of the tube is coated with a first layer comprising first grains. A second layer comprising second grains is coated on the first layer. The second grains are more positive in contact electrification than the first grains.

BRIEF DESCRIPTION OF THE DRAWINGS

The present invention will be better understood with reference to accompanying drawings, wherein same reference numerals throughout the various figures denote similar structural elements and in which.

DETAILED DESCRIPTION OF THE PREFERRED EMBODIMENTS

The preferred embodiments of the present invention will now be described in more detail with reference to the accompanying drawings.

Figure 1:
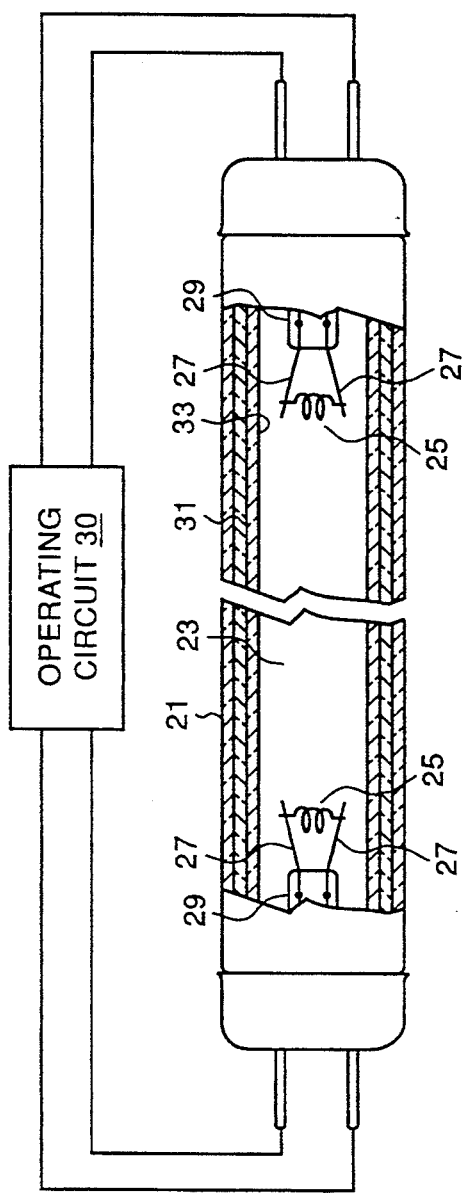
FIG. 1 is a front view in partial cross section of one embodiment of the present invention.
Figure 2:
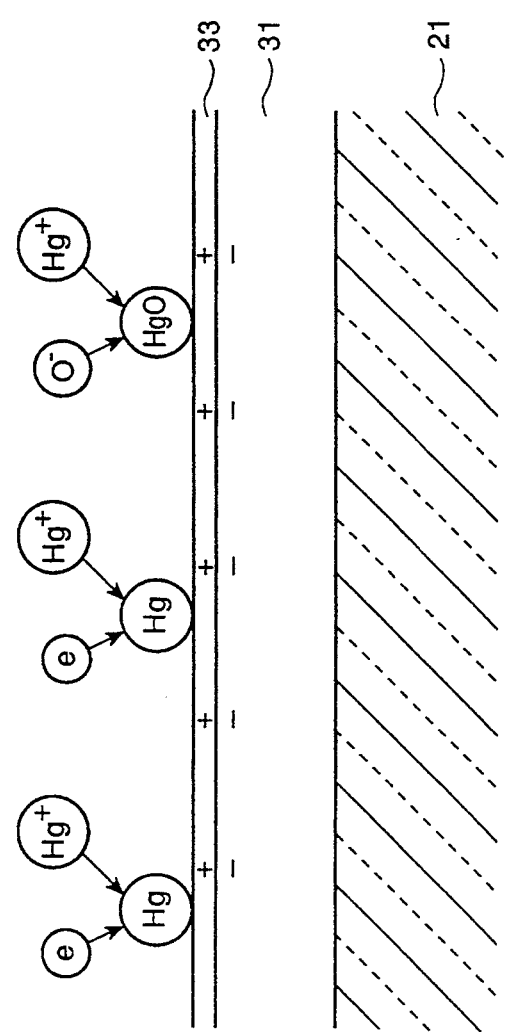
FIG. 2 is a illustrative diagram for showing a mechanism of an early decrease in luminous flux.

Referring now to FIGS. 1 and 2, embodiments of a low pressure mercury vapor discharge lamp according to the present invention will be described. The lamp has an elongated and transparent glass tube 21 defining discharge space 23 therein. Discharge space 23 is filled with an inert gas comprising a mercury vapor and a rare gas such as argon. The mercury vapor is introduced for generating a discharge between a pair of electrodes 25 provided at each end of tube 21, respectively. Each electrode 25 is supported by a pair of lead wires 27, respectively. Each pair of lead wires 27 penetrates stem 29 attached to the end the glass tube 21, respectively. The lamp is operated by operating circuit 30 so that the lamp has a wall load of 0.14 W/cm$^2$ and an average temperature in the glass tube 21 is about 70°–80° C.

The lamp has first layer 31 which is made of first grains of fluorescent material coated on an inner surface of glass tube 21. The first layer is 10–30 $\mu$m thick. In this embodiment, the grains are made of lanthanumphosphate phosphor activated by terbium and cerium defined by a chemical formula (Ce,La,Tb)(P,Si)O$_4$. This phosphor emits green light. This phosphor is described in Japanese Patent Publication No. 60-9543 in detail, the contents of which are incorporated herein by reference.

The lamp has second layer 33 which is made of second grains coated on first layer 31. Second layer 33 is 5–20 $\mu$m thick. The second grains are made of a different fluorescent material from that of first grains. Namely, the second grains are made of yttrium oxide phosphor activated by trivalent europium defined by a chemical formula Y$_2$O$_3$:Eu$^{3+}$. This phosphor is well known and emits red light. This phosphor is described in United Kingdom Patent Specification 1,458,700, the contents of which are incorporated herein by reference.

The green light from first layer 31 and the red light from second layer 33 are mixed. The mixed light is added with a blue light emitted from mercury which is excited by the discharge. Therefore, the lamp emits white light because the green light, red light and blue light are mixed. The mixed light is about 3000° K. in color temperature.

The second grains are more positive in contact electrification than the first grains. Therefore, the first layer 31 is relatively negative in charge and second layer 33 is relatively positive in charge, as shown in FIG. 2. Since the excited mercury ions are positively charged and are repulsed by the second layer 33, both layers, especially the second layer 33, can be prevented from attracting, adsorbing or reacting with the excited mercury ions.

Figure 4:
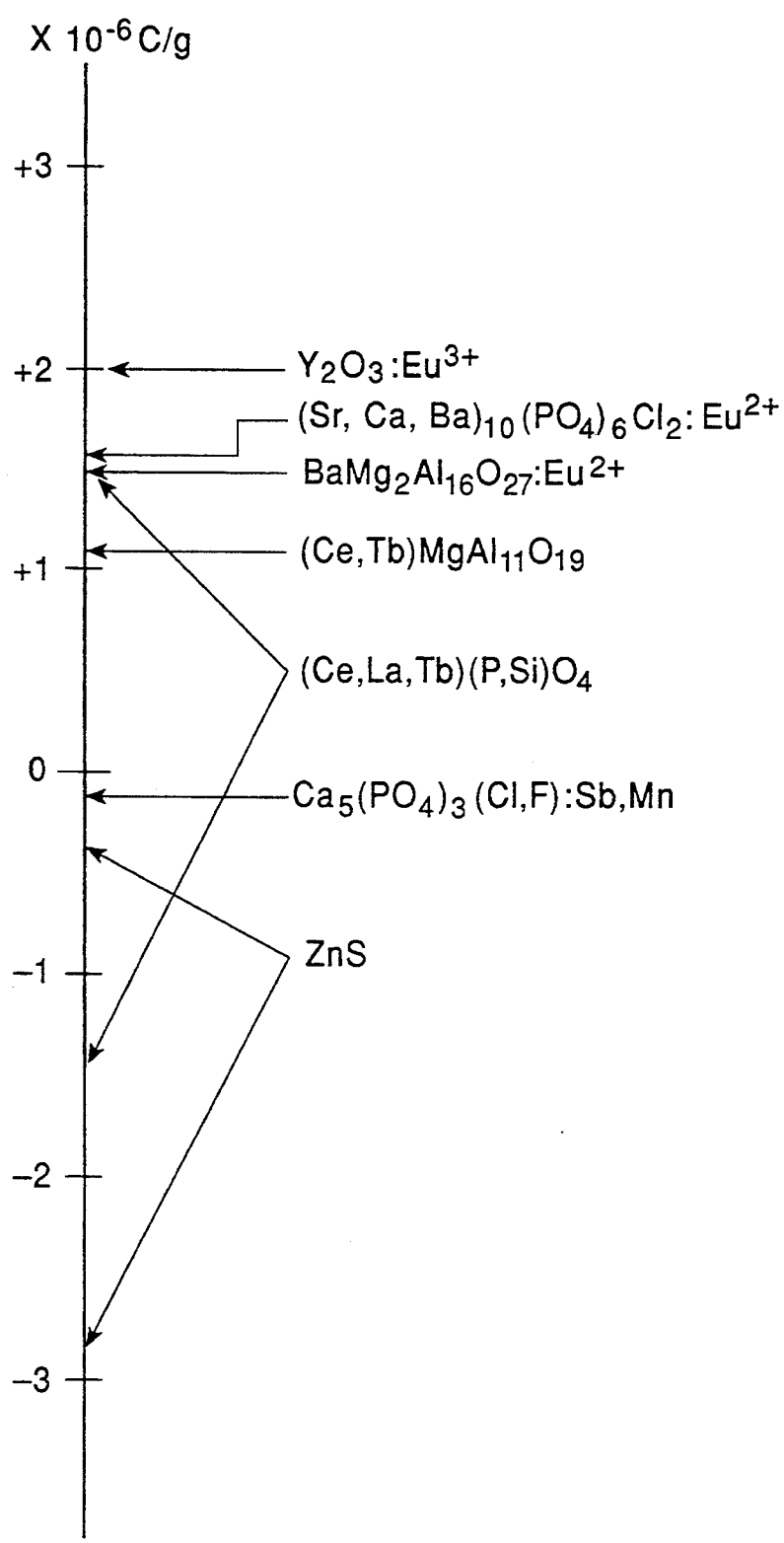
FIG. 4 is a diagram showing a contact electrification series.

The contact electrification is a characteristic of materials. The contact electrification characteristics of phosphors are explained in Extended Abstracts of Spring Meeting of Electrochemical Soc. Vol.82-1, Abstract No.487, the contents of which are incorporated herein by reference. FIG. 4 shows a diagram of contact electrification for a number of materials, mainly phosphors. The order of materials in FIG. 4 is determined by using a blow-off device.

Figure 3:
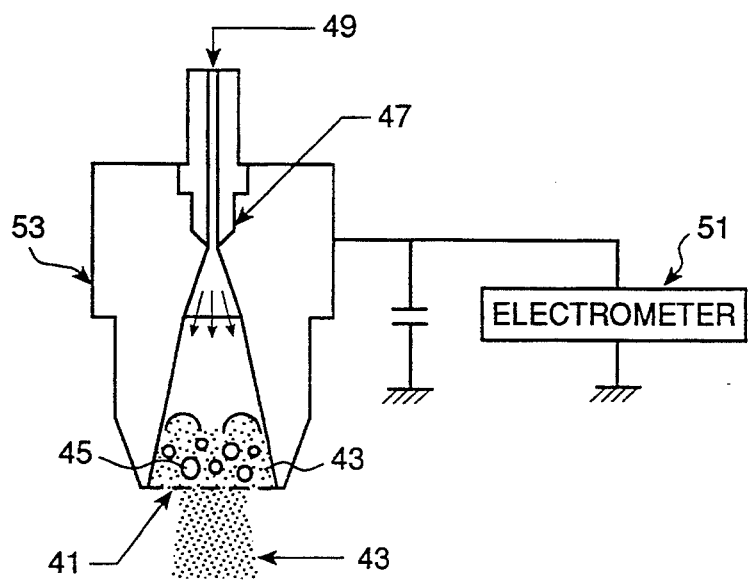
FIG. 3 is a schematic diagram of a blow-off device.

The blow-off device is generally shown in FIG. 3. The blow-off device has 400-mesh filter 41 made from stainless steel for supporting sample grains 43 to be measured and reference grains 45. Sample grains 43 and reference grains 45 are mixed with each other. Sample grains 43 are smaller in diameter than 400-mesh and reference grains 45 are larger in diameter than 400-mesh. The blow-off device has nozzle 47 for introducing compressed gas 49 such as air or $N_2$ for blowing away the sample grains 43.

Reference grains 45 take electrons away from sample grains 43 or sample grains 43 take electrons away from reference grains 45, according to the magnitude of the contact electrification of sample grains 43. In other words, reference grains 45 and sample grains 43 are charged according to the magnitude of their contact electrification. Accordingly, after sample grains 43 are blown off, charged reference grains 45 are left. The polarity and the strength of the charge of reference grains 45 are measured by electrometer 51 connected with the Faraday cage 53 of the blow-off device. In this embodiment, the reference grains are iron grains. Measurement results are not significantly affected by the particle size of reference grains 45, but are affected by the particle size of sample grains 43, according to Extended Abstracts of Spring Meeting of Electrochemical Soc. Vol.82-1, Abstract No. 487.

The contact electrification of many kinds of sample grains are shown in FIG. 4, in which iron grains were used as the reference grains. The contact electrification of lanthanumphosphate phosphor activated by terbium and cerium defined by a chemical formula $(Ce,La,Tb)(P,Si)O_4$ of the first layer 31 is more negative than that of the yttrium oxide phosphor activated by trivalent europium defined by a chemical formula $Y_2O_3:Eu^{3+}$ of second layer 33. Therefore, first layer 31 is positively charged and second layer 33 is negatively charged, as shown FIG. 2.

The contact electrification of phosphors depends on their particle sizes, manufacturing conditions and so on, and therefore, the contact electrification of some phosphors are likely to vary. The contact electrification of lanthanumphosphate phosphor activated by terbium and cerium defined by a chemical formula $(Ce,La,Tb)(P,Si)O_4$ of the first layer 31 is likely to vary between $-1.5 \times 10^{-6}$ and $+1.5 \times 10^{-6}$ C/g (coulomb per gram). However, the contact electrification of the yttrium oxide phosphor activated by trivalent europium defined by a chemical formula $Y_2O_3:Eu^{3+}$ and used as the second layer 33 is stable and is about $+2 \times 10^{-6}$ C/g (coulomb per gram). Therefore, it is always more positive than that of the lanthanumphosphate phosphor activated by terbium and cerium defined by a chemical formula $(Ce,La,Tb)(P,Si)O_4$ and used as a first layer 31, even if its contact electrification varies.

When the lamp is energized and a discharge is generated, mercury atoms (Hg) are ionized in discharge space 23 and changed into mercury ions ($Hg^+$). Some of these mercury ions ($Hg^+$) combine with electrons ($e^-$) near second layer 33 and change into mercury atoms (Hg). Other mercury ions ($Hg^+$) combine with oxygen ions ($O^-$) and change into mercury oxides (HgO). The mercury atoms and the mercury oxides have a positive charge tendency like the mercury ions. Therefore, if second layer 33 is negatively charged, second layer 33 easily attracts the mercury ions, the mercury atoms and mercury oxides by an electrostatic force. However, the second layer 33 of the embodiment is positively charged and thus second layer 33 does not easily attract, adsorb and react with the ions, the mercury atoms and mercury oxides. Therefore layer 33 generates a repelling force based on the electrostatic force between the mercury ions etc. and the second layer 33. As a result, the luminous flux of the lamp is maintained and an early decrease in luminous flux is reduced.

To confirm the effects of the invention, three lamps were prepared. Example 1 herein is the lamp described above. The phosphor of the first layer has a contact electrification of $-1.5 \times 10^{-6}$ C/g (coulomb per gram). Example 2 herein has the same phosphor used for first layer 31 as that of example 1 and, however, has a lanthanumphosphate phosphor activated by terbium and cerium defined by a chemical formula $(Ce,La,Tb)(P,Si)O_4$ for second layer 33. The phosphor of second layer 33 of example 2 is similar to the phosphor of first layer 31 and is different from the phosphor of second layer 33 of example 1. The phosphor of second layer 33 of example 2 has a contact electrification of $+1.44 \times 10^{-6}$ C/g (coulomb per gram), which is more positive than that of the first layer of example 2.

To be compared with example 1 and example 2, a lamp having only first layer which is made of the same phosphor as that of the first layer 31 of example 1 and example 2 was prepared (a comparison lamp).

Figure 5:
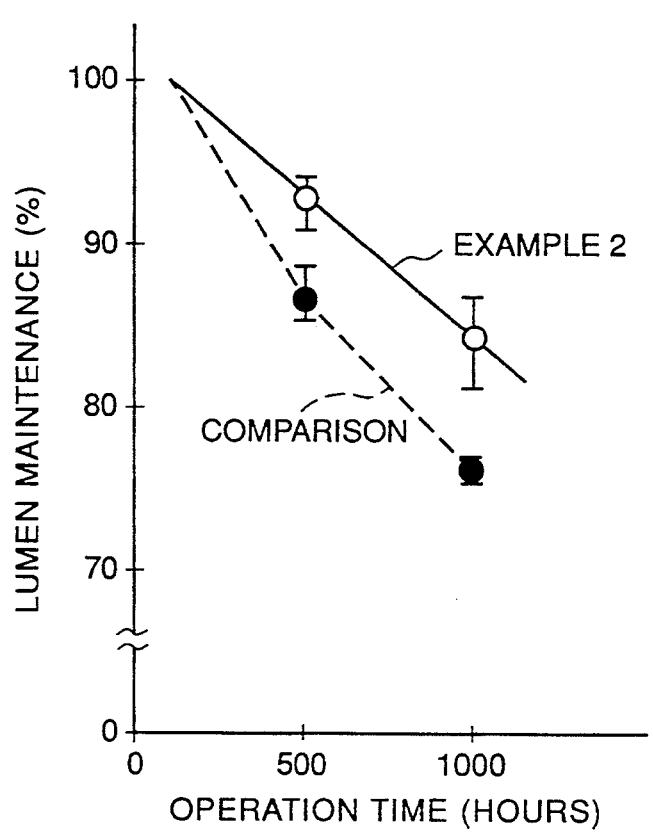
FIG. 5 is a graph showing luminance over time.

The luminous fluxes of these three lamps were measured and the lumen maintenance ratio of luminous flux values over time is shown in Table I. The lumen maintenance ratio is defined as the luminous flux after 1000 hours of operation divided by an initial luminous flux. The lumen maintenance ratio of example 2 and the comparison lamp over time is shown in FIG. 5.

TABLE I

| SAMPLE | FIRST LAYER | SECOND LAYER | MAINTENANCE |
|---|---|---|---|
| Comparison Lamp | (La, Tb, Ce) (P, Si)O$_4$ | None | 76% |
| Example 1 | (La, Tb, Ce) (P, Si)O$_4$ $-1.5 \times 10^{-6}$ c/g | Y$_2$O$_3$:E$^{3+}$ $+2 \times 10^{-6}$ c/g | 91% |
| Example 2 | (La, Tb, Ce) (P, Si)O$_4$ $-1.5 \times 10^{-6}$ c/g | (La, Tb, Ce) (P, Si)O$_4$ $+1.44 \times 10^{-6}$ c/g | 83% |

Example 2 has a higher lumen maintenance ratio than the comparison lamp based on the value of the contact electrification, even if phosphors having the same chemical formula are used. Furthermore, because the contact electrification of the phosphor of the second layer of example 1 is higher than that of example 2, the lumen maintenance ratio of example 1 is higher than that of example 2.

Furthermore, the quantities of mercury adsorbed by second layer 33 of example 2 and the comparison lamp after 1000 hours operation were measured. The mercury absorbed by second layer 33 of example 2 was 0.46 mg per piece and the mercury adsorbed by second layer 33 of the comparison lamp was 1.20 mg per piece. It is understood that the improvement of the lumen maintenance ratio of examples 1 and 2 is caused by the decrease in mercury adsorption by the phosphor.

EXAMPLE 3

The present invention can be applied to many different combinations of the first layer and the second layer from those of examples 1 and 2. Example 3 has a first layer made of a fluorescent material comprising a calciumhalophosphate phosphor activated by antimony and manganese defined by a chemical formula $Ca_5(PO_4)_3(Cl,F):Sb,Mn$ which is about 5000° K. in color temperature. This phosphor is well-known and conventional. This phosphor emits many kinds of white light, according to the ratio of the activators of antimony and manganese. This phosphor has a contact electrification of $-0.1 \times 10^{-6}$ c/g. The value of the contact electrification of this phosphor is relatively low as compared with those of rare earth metal phosphors such as $Y_2O_3:Eu^{3+}$, $(Ce,Tb)MgAl_{11}O_{19}$, $BaMg_2Al_{16}O_{27}:Eu^{2+}$, $(Sr,Ca,Ba)_{10}(PO_4)_6Cl_2:Eu^{2+}$ and so on. Accordingly, phosphors of second layer 33 are selected from these rare earth metal phosphors. Namely, the second layer comprises three kinds of phosphors: the phosphor $(Ce,Tb)MgAl_{11}O_{19}$, the phosphor $BaMg_2Al_{16}O_{27}:Eu^{2+}$ and the phosphor $Y_2O_3:Eu^{3+}$.

The phosphor $(Ce,Tb)MgAl_{11}O_{19}$ emits green light and is described in U.S. Pat. No. 3,937,998 and U.S. Pat. No. 4,216,408, the contents of both of these patents being incorporated herein by reference. The phosphor $BaMg_2AlO_{27}:Eu^{2+}$ emits blue light and is also described in U.S. Pat. No. 4,216,408. The phosphor $(Sr,Ca,Ba)_{10}(PO_4)_6Cl_2:Eu^{2+}$ emits blue light and is described in U.S. Pat. No. 4,038,204, the contents of which are incorporated by reference.

The second layer has three kinds of phosphors and each phosphor emits blue light, green light or red light. Each light is mixed together and white light is generated by the mixture. Therefore, second layer 33 emits white light.

In this example, the contact electrification value of the phosphor $(Ce,Tb)MgAl_{11}O_{19}$ and the phosphor $Y_2O_3:Eu^{3+}$ are higher than that of the phosphor $Ca_5(PO_4)_3(Cl,F):Sb,Mn$ of the first layer 31. Therefore, when the mixing ratio of the phosphor $(Ce,Tb)MgAl_{11}O_{19}$ and the phosphor $Y_2O_3:Eu^{3+}$ is increased, the contact electrification of second layer 33 becomes higher than that of the first layer 31. When the mixing ratio of the phosphor $(Ce,Tb)MgAl_{11}O_{19}$, the phosphor $Y_2O_3:Eu$ and the phosphor $BaMg_2Al_{16}O_{27}:Eu^{2+}$ are 40%, 40% and 20%, respectively, the mixed phosphors emit white light of about 5000° K. in color temperature and the lamp maintains luminous flux well. Furthermore, a color temperature may be varied according to the mixing ratio of these phosphors.

EXAMPLE 4

Since some phosphors may have a range of contact electrification as controlled during manufacturing, a phosphor manufactured to have a comparatively high or positive contact electrification may be used for second layer 33 and a phosphor having the same chemical composition, but manufactured to have a comparatively low or negative contact electrification may be used for first layer 31. For example, the material of both first layer 31 and second layer 33 may be ZnS. However, the phosphor ZnS of the second layer 33 is more positive in contact electrification than the phosphor ZnS of first layer 31.

EXAMPLE 5

Materials of the first layer and second layer are not limited to phosphors and may be metal oxide grains. A material of first layer 31 is the phosphor $Ca_5(PO_4)_3(Cl,F):Sb,Mn$ and a material of the second layer is zinc oxide grains whose contact electrification is more positive than that of the phosphor $Ca_5(PO_4)_3(Cl,F):Sb,Mn$.

The present invention may be applied to a ultraviolet lamp which is one kind of low pressure mercury vapor discharge lamp. The ultraviolet lamp may have a reflection layer as a first layer and a diffusion layer as a second layer. The ultraviolet lamp is used for emitting ultraviolet rays. The reflection layer is provided for reflecting ultraviolet rays to a specific direction and the diffusion layer is provided for evenly distributing the ultraviolet rays over the surface of the lamp. Such a lamp may be obtained by selecting materials in which the diffusion layer is more positive in contact electrification than a material of the reflection layer.

Although only a few embodiments have been described in detail above, those having ordinary skill in the art will certainly understand that many modifications are possible in the preferred embodiment without departing from the teachings thereof.

All such modifications are intended to be encompassed within the following claims.

What is claimed is:

1. A low pressure mercury vapor discharge lamp having a wall load of more than 550 W/m², comprising:
   a glass tube having an inner surface and defining a discharge space;
   a gas mixture including mercury and a rare gas filling said discharge space;
   a pair of electrodes provided in said glass tube for generating a discharge in said discharge space;
   a first layer comprising first grains and being coated inside said inner surface; and
   a second layer comprising second grains and being coated on said first layers, wherein said second grains are more positive in contact electrification than said first grains so that contact between said first and second layers causes said second layer to have a positive charge with respect to said first layer.

2. The low pressure mercury vapor discharge lamp according to claim 1, further comprising a power supply connected to said electrodes to generate a wall loading of at least 550 W/m².

3. The low pressure mercury vapor discharge lamp according to claim 1, wherein said first grains are made of a fluorescent material.

4. The low pressure mercury vapor discharge lamp according to claim 3, wherein said second grains are made of a metal oxide material.

5. The low pressure mercury vapor discharge lamp according to claim 3, wherein said second grains are made of a fluorescent material.

6. The low pressure mercury vapor discharge lamp according to claim 5, wherein said first grains are made of a fluorescent material of calciumhalophosphate phosphor activated by antimony and manganese defined by a chemical formula $Ca_5(PO_4)_3(Cl,F):Sb,Mn$ which emits white light and said second grains are made of a fluorescent material comprising at least one rare earth metal phosphor.

7. The low pressure mercury vapor discharge lamp according to claim 6, wherein said fluorescent material of said second layer comprises mixed phosphors which are composed of a phosphor emitting a red light, a phosphor emitting green light and a phosphor emitting blue light, and which when mixed, emit white light.

8. The low pressure mercury vapor discharge lamp according to claim 5, wherein said first grains and said second grains are made of a fluorescent material comprising at least one rare earth metal phosphor, respectively.

9. The low pressure mercury vapor discharge lamp according to claim 8, wherein said fluorescent material of said first layer comprises lanthanumphosphate phosphor activated by terbium and cerium defined by a chemical formula $(Ce,La,Tb)PO_4$ which emits green light and said fluorescent material of said second layer comprises yttrium oxide phosphor activated by trivalent europium defined by a chemical formula $Y_2O_3{:}Eu^{3+}$ which emits red light.

10. The low pressure mercury vapor discharge lamp according to claim 8, wherein said fluorescent material of said first layer comprises lanthanumphosphatesilicate phosphor activated by terbium and cerium defined by a chemical formula $(Ce,La,Tb)(P,Si)O_4$ and said fluorescent material of said second layer comprises yttrium oxide phosphor activated by trivalent europium defined by a chemical formula $Y_2O_3{:}Eu^{3+}$ which emits red light.

11. The low pressure mercury vapor discharge lamp according to claim 1, wherein said second grains are made of a fluorescent material.

12. The low pressure mercury vapor discharge lamp according to claim 1, wherein said first grains and said second grains are made of material having the same chemical formula.

13. The low pressure mercury vapor discharge lamp according to claim 1, wherein said lamp is a fluorescent discharge lamp and said first and second layers are fluorescent materials.

14. The low pressure mercury vapor discharge lamp according to claim 1, wherein said lamp is a UV discharge lamp and said first layer is a reflection layer and said second layer is a diffusion layer.

* * * * *